US010000643B1

(12) United States Patent
Tsang et al.

(10) Patent No.: US 10,000,643 B1
(45) Date of Patent: *Jun. 19, 2018

(54) WATERBORNE CORROSION RESISTANT ORGANIC PRIMER COMPOSITIONS

(71) Applicant: The United States of America as Represented by the Secretary of the Navy, Washington, DC (US)

(72) Inventors: Joseph W. Tsang, Ridgecrest, CA (US); Michael E. Wright, Ridgecrest, CA (US); Andrew P. Chafin, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/958,526

(22) Filed: Dec. 3, 2015

Related U.S. Application Data

(60) Provisional application No. 62/059,361, filed on Oct. 3, 2014.

(51) Int. Cl.
| | |
|---|---|
| *C09D 163/00* | (2006.01) |
| *C09D 5/08* | (2006.01) |
| *C09K 15/26* | (2006.01) |
| *C09K 15/30* | (2006.01) |
| *C08K 5/34* | (2006.01) |
| *C08K 5/3432* | (2006.01) |
| *C08K 5/3437* | (2006.01) |
| *C08K 5/45* | (2006.01) |
| *C08K 5/46* | (2006.01) |
| *C09D 5/00* | (2006.01) |

(52) U.S. Cl.
CPC ............ *C09D 5/086* (2013.01); *C08K 5/34* (2013.01); *C08K 5/3432* (2013.01); *C08K 5/3437* (2013.01); *C08K 5/45* (2013.01); *C08K 5/46* (2013.01); *C09D 5/002* (2013.01); *C09D 163/00* (2013.01); *C09K 15/26* (2013.01); *C09K 15/30* (2013.01)

(58) Field of Classification Search
CPC ..... C08L 63/00–63/10; C09D 163/00–163/10; C09D 5/086; C09D 5/002; C09J 163/00–163/10; C09K 15/26; C09K 15/30; C08K 5/34; C08K 5/3432; C08K 5/3437; C08K 5/45; C08K 5/46

See application file for complete search history.

(56) References Cited

U.S. PATENT DOCUMENTS

| | | | | | |
|---|---|---|---|---|---|
| 3,436,392 | A * | 4/1969 | Wiebelhaus | ......... | C07D 279/18 544/39 |
| 5,021,471 | A * | 6/1991 | Treybig | ............. | C08G 59/1444 523/414 |
| 6,143,809 | A * | 11/2000 | Elmore | ...................... | C08J 3/03 523/404 |
| 9,458,329 | B1 * | 10/2016 | Wright | ..................... | C09D 5/08 |
| 2005/0157390 | A1 * | 7/2005 | Weiss | ..................... | G02B 5/124 359/529 |
| 2007/0088117 | A1 * | 4/2007 | Zhou | ......................... | C08J 3/05 524/539 |
| 2012/0258249 | A1 * | 10/2012 | Adamson | ............. | C09D 163/00 427/385.5 |
| 2013/0237639 | A1 * | 9/2013 | Ogura | ...................... | C08G 8/36 523/400 |
| 2014/0099508 | A1 * | 4/2014 | Zhou | ....................... | C08K 5/17 428/413 |
| 2014/0255679 | A1 * | 9/2014 | Goeb | ........................ | C09J 7/00 428/305.5 |
| 2015/0267074 | A1 * | 9/2015 | Heine | ...................... | C08K 5/54 523/400 |

OTHER PUBLICATIONS

Kawanishi et al., "Coulombic Effect on Photoinduced Electron-Transfer Reactions between Phenothiazines and Viologens," J. Phys. Chem. 90, 2469-2475 (1986).*
Momentive Coatosil MP200 Silane (2012).*
Dowanol PPH Data Sheet (2012).*
Watkins et al., "Formulating High-Performance Waterborne Epoxy Coatings," Paper Presented to Thermoset Resin Formulators Association (2006).*

* cited by examiner

Primary Examiner — Kregg T Brooks
(74) Attorney, Agent, or Firm — Stuart H. Nissim

(57) ABSTRACT

The present invention provides a pigment/additive comprising discrete multivalent oxidation state (DiMVO) phenothiazine compounds having corrosion inhibiting properties. These novel DiMVO phenothiazines are useful in preparing waterborne primer coating formulations for application to metals and metal alloys and demonstrating corrosion inhibiting properties. Furthermore, such formulations are chromate-free and have reduced VOC content. Methods of preparing and using such compounds and waterborne formulations also are described.

12 Claims, No Drawings

WATERBORNE CORROSION RESISTANT ORGANIC PRIMER COMPOSITIONS

CROSS-REFERENCE TO RELATED APPLICATIONS

This is a non-provisional patent application, claiming the benefit of, parent application Ser. No. 62/059,361 filed on Oct. 3, 2014, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to corrosion resistant additives and primer formulations for metal (e.g., aluminum, ferrous, and alloy) substrates.

BACKGROUND OF THE INVENTION

Various metals, and particularly, alloys of aluminum, steel, iron, etc., are commonly used in marine, aerospace, construction, automobile and other applications. Corrosion inhibitive compounds have long been used in an effort to protect these metallic surfaces. Generally, these alloys are protected against corrosion by applying primers or volatile organic coatings containing corrosion inhibitors.

A variety of treatments have been developed in an attempt to provide corrosion resistant properties. Typically, such treatments utilize organic solvents as well as chromium-based compounds. Examples of such compounds include: barium or strontium chromate particles used as inhibitive pigments in adhesives, paints and primers; and chromic acid, which is used to produce a chromium rich conversion coating. Inorganic pigments derived from salts of zinc and chromate (Cr VI) metals have been used in corrosion resistant primer paints on metal surfaces. Alkali earth metal chromates containing trivalent as well as hexavalent chromium as additives for metal protective pigments are disclosed by Patterson, et al., in U.S. Pat. No. 2,387,528 and protective pigments comprising calcium chromate associated with minor additions of ferric, manganic or chromic oxides are described by C. Sloan in U.S. Pat. No. 2,430,589.

Typical corrosion resistant primers used for metals are solvent based epoxy primers which employ hexavalent chromium as an active corrosion inhibitor pigment additive. These primers rely on the hexavalent chromium for corrosion protection. However, chromium conversion coating is the subject of concern due to its toxicity to humans and to the environment. Hexavalent chromium compounds are recognized by the U.S. National Institute of Environmental Health Sciences (NIEHS) (Report on Carcinogens, Eleventh Edition) as a known Group I human carcinogen. With both federal and state legislative efforts to reduce the use of hexavalent chromium and volatile organic content in paints and primers, developing chromium-free, waterborne corrosion resistant compositions is vital.

It is extremely desirable to find a waterborne, chromium-free solution for effective corrosion resistance in the effort to reduce both the emission of Volatile Organic Compounds ("VOCs") and the use of toxic chromium compounds. The present invention provides water based, organic, chromium free additives, formulations, and primers that provide the desired corrosion inhibition for metals.

It is to be understood that the foregoing is exemplary and explanatory only and are not to be viewed as being restrictive of the invention, as claimed.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to corrosion resistant additives and formulations.

The present invention provides corrosion inhibition by using additives and formulations comprising molecules that exhibit discrete multivalent oxidation states (DiMVO). Preferred DiMVO molecules are comprised of substituted phenothiazine.

DiMVO molecules are designed with a hydrophobic group on one end with a hydrophilic group on the opposite end. One preferred hydrophobic group is phenothiazine. Examples of suitable hydrophilic groups include cationic (positively charged), anionic (negative charged), zwitterionic (both cationic and negative charged) and non-ionic (neutral charged) groups. Therefore, depending on the selected hydrophilic group and chemical structure, the solubility in different solvent systems can be controlled. These hydrophilic groups enable to solubilize the DiMVO molecule in water. The cationic, anionic, zwitterionic and non-ionic groups are all polar in nature and interact strongly with water to impart water solubility.

The DiMVO molecules can be formulated into a solvent-based or a water-based (waterborne) primer for example. The novel compounds and formulations of the present invention are preferably water-based, thereby decreasing the need to use volatile organic compounds. They are also organic compounds, eliminating the toxicity of using inorganic corrosion inhibiting compounds such as chromate VI compounds.

Phenothiazines have several oxidation states which participate in the reduction-oxidation reactions in preventing metal corrosion. This is analogous of sacrificial metals such as Mg and Zn which are used in galvanizing process that prevents the underlying steel or aluminum from oxidizing. Mg and Zn themselves oxidize instead of steel and aluminum. The phenothiazines can be substituted with pendant groups, for example alkyl and aryl groups on the phenothiazine ring structures. Furthermore, the phenothiazines can also be fused aromatic ring structures of the parent phenothiazines.

DiMVO Physical Properties

Preferred DiMVO molecules of the invention possess one or more of the following physical properties. These molecules are preferably soluble in water up to 20 weight % in an aqueous solution of either an acidic, neutral or basic pH. The DiMVO molecules may exhibit surfactant-like behavior that aggregate to form micelles at a concentration better known as the critical micelle concentration (CMC). The CMCs may differ for each DiMVO molecule depending on the specific chemical structures. The ability to form micelles by themselves allows the DiMVO molecules to be soluble in aqueous solutions without other added surfactants. Formulating primer coatings is therefore simplified and can save material costs. The ability of the DiMVO compounds of the present invention to form micelles is novel; since many organic corrosion inhibiting pigments are not very water soluble. If the DiMVO molecules are NOT sufficiently water-soluble, surfactants or polymeric dispersants must be added to disperse the material. In either case, DiMVO must be solubilized and/or dispersed to form colloidally stable primer solutions that do not settle from solution in storage.

Having this unique physical property, added surface active species such as surfactants or dispersants are not required with these DiMVO compounds. Also, the DiMVO molecules may aggregate with added surface active species as co-surfactants and become dispersible in solution. Surfactants may be added if high concentrations of DiMVO molecules are required in the primer formulations.
Water-Soluble or Dispersible DiMVO Molecules
Preferred DiMVO Molecules have the Formula:

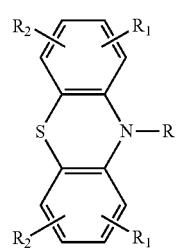

wherein R is a polar, hydrophilic group, and $R_1$ and $R_2$ are H or alkyl or alkylene groups of $C_1$ to $C_{20}$.

Ring Opening Reaction

Generally used in the arts of colloid science and surfactants, ring opening polymerization is a common route to prepare commercial surfactants. Water-dispersible DiMVO can be prepared using ring opening reactions as illustrated in figure 1 and Examples 1-6 starting from phenothiazine and readily available cyclic moieties, for example, cyclic sultones, ethers, carbonates, lactones, and lactames. The DiMVO molecules can be synthesized to have either cationic (positively charged), anionic (negative charged), zwitterionic (both cationic and negative charged), or non-ionic (neutral charged) characteristics. In addition, the solubility of the DiMVO molecules will be controlled by the stoichiometric ratio between the cyclic monomers to phenothiazine. Hence the hydrophilic and water-soluble groups are tailored specifically for these compositions to be dispersible in aqueous formulations.

Excessive solubility or insolubility of corrosion inhibitory additives will result in premature coating failure. For example, excessive solubility to water from the environment will lead to rapid loss of corrosion prevention after achieving good early performance. Highly ionic species such as zinc phosphates, zinc borates and zinc phosphor-oxide complexes that are available from Halox Pigments do not provided the desired performance required as corrosion resistant primer coatings. Conversely, insoluble anti-corrosion molecules will exhibit poor early corrosion prevention that eventually levels off.

The structures of DiMVO molecules are important to provide an appropriate level of solubility in either the cured epoxy matrix or in the environment of use, which ultimately affects their corrosion prevention performance.

The following examples are for illustration purposes only and not to be used to limit any of the embodiments.

EXAMPLES

Examples 1-6 for the preparation of water-dispersible phenothiazine derivatives

Example 1

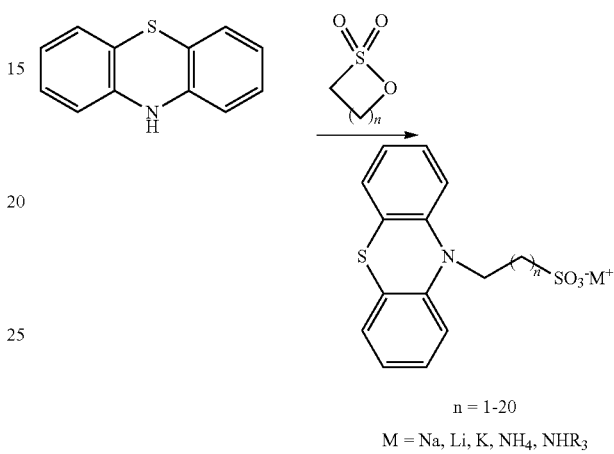

n = 1-20

M = Na, Li, K, $NH_4$, $NHR_3$

Example 2

$CH_2CH_2CH_2SO_3Li^+$

Lithium 3-(10H-phenothiazin-10-yl)propane-1-sulfonate

To a solution of 25 grams phenothiazine (0.125 mol) in 300 mL dry THF at −70° C. was added 50 mL 2.5M n-BuLi. The mixture was allowed to warm to −15° C. then cooled back to −70° C. A solution of 15.27 grams 1,3-propane sultone (0.125 mol) in 50 mL THF was then added. The mixture was allowed to warm to room temperature then stirred overnight. The solvent was then removed in vacuum to give 50.42 grams of a yellowish glass. This was recrystallized from 400 mL ethanol to give 10.54 grams of a white solid (26%). 1H NMR (DMSO-d6): 7.1 (m, 4H), 7.0 (d, 2H), 6.8 (t, 2H), 3.94 (t, 2H), 2.47 (t, 2H), 1.95 (m, 2H.

Example 3

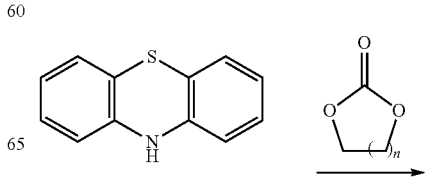

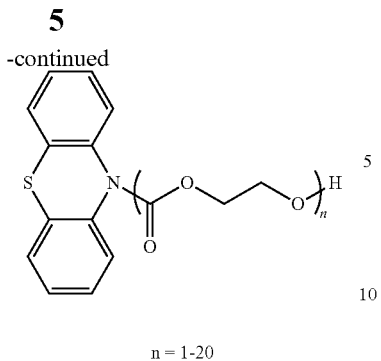

n = 1-20

Example 4

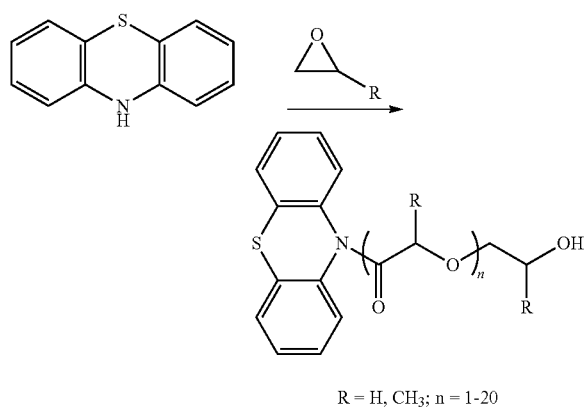

R = H, CH₃; n = 1-20

Example 5

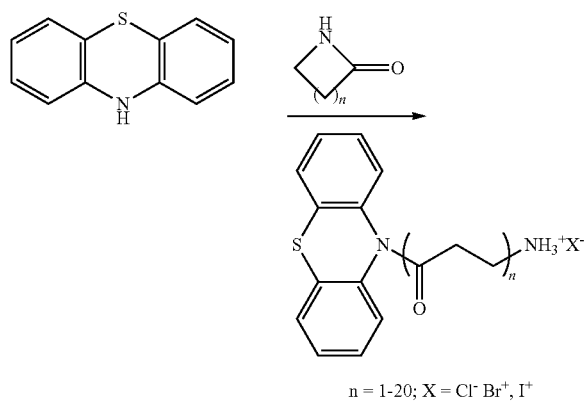

n = 1-20; X = Cl⁻ Br⁺, I⁺

Example 6

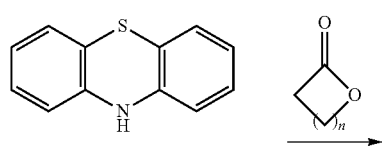

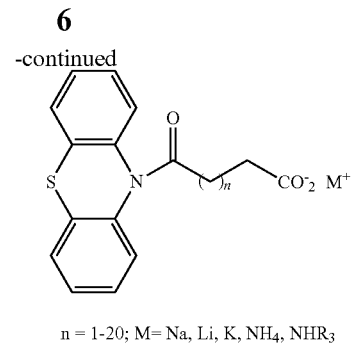

n = 1-20; M= Na, Li, K, NH₄, NHR₃

Preparation of DiMVO Waterborne Primer Coatings

In view of current environmental regulations of volatile organic compounds (VOC) emission, waterborne primer coatings are preferred. Waterborne primers typically provide VOC in the range of 50-200 g/liter of paint while the solvent-borne paints have VOC at much higher values. Epoxy is the resin of choice in solvent-borne primer coatings; they are, however, hydrophobic in nature which poses challenges to formulate them into an aqueous or waterborne system. One approach is to partially react some of the epoxy groups on oligomers with surfactants so that the surfactant-modified epoxy forms stable colloid particles in a continuous aqueous phase. Such modified epoxies are commercially available, for example as EPI-REZ 6520 from Momentive Chemical.

Epoxy resins can be cured with a large selection of curing agents to form primer coatings. Polyamines and polyamides are commonly used in a two-part epoxy system. The epoxy resin (Part A) is kept separately from the curing agent (Part B). Parts A and B are mixed according to their stoichiometric ratio (epoxy equivalent weight:amine equivalent weight) prior to coating application. Using the same approach, surfactant modified and water-dispersible polyamines and polyamides are chemically modified with surfactants to form colloid particles. Water-dispersible polyamines and polyamides are commercially available, for example, as EPI-KURE 6870 from Momentive Chemical.

Polar organic solvents with high boiling points (>200° C.) are preferred in formulating waterborne compositions. These solvents are miscible with water in addition to the epoxy and curing agent dispersions. Examples include propylene glycol propyl ether, propylene glycol n-butyl ether, propylene glycol phenyl ether, ethylene glycol propyl ether, ethylene glycol propyl ether, dipropylene glycol methyl ether and tripropylene glycol methyl ether.

These co-solvents are added preferably to the epoxy resin (Part A) rather than the amine curing agent (Part B) during the coating application. Upon mixing Part A and B, film formation starts as the epoxy and curing agent particles coalesce.

An example of a waterborne epoxy primer composition according to the present invention comprises:

about 0.01 to about 20% by weight of one or more DiMVO molecules;

about 10 to about 60% by weight of a surfactant-modified epoxy;

about 5 to about 20% by weight of a surfactant-modified, water-dispersed curing agent, preferably a polyamine, a polyamide, their adducts or combinations thereof;

about 5% to about 40% by weight of one or more high boiling polar organic solvents;

about 0.1% to about 5% by weight of an alkoxysilane coupling agent;

about 5% to about 30% by weight of a pigment wetting surfactant;

about 0.5% to about 20% by weight of pigments;

about 0.5% to about 20% by weight of fillers; and,

In a preferred embodiment the surfactant-modified epoxy is a oligomer dispersion, wherein the oligomers have an epoxy equivalent weight (EEW) in the range of 100-800 g/eq, preferably comprised of at least two epoxy functional groups with a molecular weight in the range of 300 to 10,000, having an epoxy equivalent weight in the range of 100-400, and particle size in the range 0.5 to 10,000 microns (□m) in aqueous solutions.

In a preferred embodiment the surfactant-modified, water-dispersed curing agent is comprised of a polyamine curing agent, a polyamide curing agent, adducts thereof, or mixtures thereof having amine hydrogen equivalent weight in the range of about 20-400;

In a preferred embodiment the high boiling polar organic solvents include, for example, glycol ethers, alkane diols, 2-pyrrolidone, N-methylpyrrolidone, and combinations thereof, more preferably, propylene glycol propyl ether, propylene glycol n-butyl ether, propylene glycol phenyl ether, tripropylene glycol n-butyl ether, ethylene glycol propyl ether, ethylene glycol propyl ether, and dipropylene glycol methyl ether.

In a preferred embodiment the alkoxysilane coupling agent includes, for example, of mono-methoxysilanes, di-methoxysilanes, tri-methoxysilanes, mono-ethoxysilanes, di-ethoxysilanes, tri-ethoxysilanes, and combinations thereof.

In a preferred embodiment the pigment wetting surfactant includes, for example, copolymers and block copolymers of polyethylene glycol ethers, polyethylpropylene glycol ethers, polydimethylsiloxanes, and combinations thereof.

Preferred pigments include, for example, metal oxides, and carbon black.

Preferred fillers include, for example, metal carbonates, silica, and alumina.

Example 7

| Epoxy resin | | |
|---|---|---|
| Part A components (supplier.) | Weight % in primer composition | By weight, g |
| EPI-REZ Resin 6520-WH-53 (Momentive) | 32.0% | 314.7 g |
| Propylene glycol propylene ether (Dow) | 0.7% | 7.3 g |
| Propylene glycol phenyl ether (Dow) | 1.3% | 12.8 g |
| Lithium 3-(10H-phenothiazin-10-yl)propane-1-sulfonate DiMVO (NAWCWD) | 8.0% | 92.8 g |
| Ti-Pure R-960 pigment (DuPont) | 12.8% | 125.9 g |
| Wet ground mica, 325 mesh (King Mountain Minerals) | 3.1% | 3.1 g |

The above mixture is stirred with a high speed stirrer for 15 minutes until all solids are thoroughly wet and finely divided. Mixing speed is reduced while the ingredients below are added and stirred for another 15 minutes.

| | | |
|---|---|---|
| EPI-REZ Resin 6520-WH-53 (Momentive) | 13.1% | 129.0 g |
| CoatOSil1770 Silane (Moinentive) | 0.5% | 4.5 g |
| Deionized water | 28.5% | 293.1 g |
| Total Part A = 100 % | | 983.2 g |

Example 8

| Curing agent | | |
|---|---|---|
| Part B components (supplier) | Weight % in primer composition | By weight, g |
| EPIKURE curing agent 6870-W-53 (Momentive) | 64.3% | 113.5 g |
| Raybo 60 (Raybo Chemical) | 1.2% | 2.1 g |
| Deionized water | 34.5% | 60.8 g |
| Total Part B = 100 % | | 176.4 g |

Example 9

Epoxy-Based Primer

In this example, the mix ratio for Part A from Example 7 to Part B from Example 8 is 4:1 by weight. The amine hydrogen equivalent (curing agent) to epoxy equivalent ratio (based on the weight % solid in EPI-REX Resin 6520-WH-53) is 0.6:1. This composition contains 39 wt % solid and the volatile organic compound (VOC) at about 80-90 g per liter.

Preferred compositions can contain up 20 weight % of the DiMVOs. Higher percentages may require the addition of surfactants or dispersants. The DiMVOs can be incorporated individually or in various combinations of different DiMVOs, e.g. one or more different cationic DiMVO compounds or one or more anionic DiMVO compounds in combination with one or more zwitterionic DiMVO compounds, or various other combinations.

Although embodiments of the invention are described in considerable detail, including references to certain versions thereof, other versions are possible. Examples of other versions include using different lipophilic moieties, different primer formulations, different resins, and different bases. Therefore, the spirit and scope of the appended claims should not be limited to the description of versions included herein.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Major advantages of the invention include, but are not limited to decreased VOC content, water-based compositions, the elimination of toxic inorganic additives, and the ease of preparation.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A waterborne corrosion resistant primer composition comprising:
    at least one discrete multivalent oxidation state (DiMVO) phenothiazine; and,
    a primer base;
wherein said at least one discrete multivalent oxidation state (DiMVO) phenothiazines have the formula:

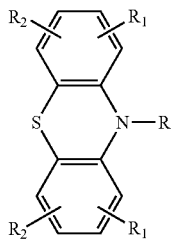

wherein R is a polar, hydrophilic group selected from the group consisting of:

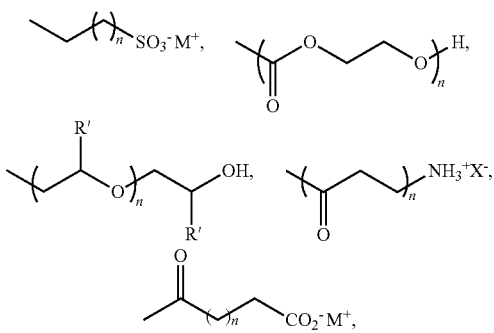

or combinations thereof;
where n is 2-20;
where M is Na, Li, K, $NH_4$, or $NHR''_3$, where R" is alkyl groups of $C_1$-$C_{10}$;
where R' is H or $CH_3$; and,
where X is Cl, Br, or I; and,
wherein $R_1$ and $R_2$ are H or alkyl or alkylene groups of $C_1$ to $C_{20}$.

2. The composition of claim 1 comprising:
    at least one discrete multivalent oxidation state (DiMVO) phenothiazine;
    at least one epoxy resin;
    at least one surfactant-modified curing agent;
    at least one high boiling organic solvents having boiling points>200° C.;
    an alkoxysilane coupling agent;
    a pigment wetting surfactant;
    at least one pigment;
    at least one filler; and,
    water.

3. The composition of claim 2 wherein said epoxy resin comprises at least one surfactant-modified epoxy.

4. The composition of claim 3 wherein said surfactant-modified epoxy comprises of at least two epoxy functional groups with a molecular weight in the range of 300 to 10,000, having an epoxy equivalent weight in the range of 100-800, and particle size in the range 0.5 to 10,000 microns (μm) in aqueous solutions.

5. The composition of claim 2 wherein said surfactant-modified curing agent for said epoxy resin comprises of at least one water-dispersed polyamines, polyamides, and adducts thereof with amine hydrogen equivalent weight in the range of about 20-400.

6. The composition of claim 1 comprising:
    about 0.1% to about 20% by weight of one or more DiMVO molecules;
    about 10% to about 60% by weight of epoxy resin;
    about 5% to about 20% by weight of surfactant-modified curing agent;
    about 5% to about 40% by weight of one or more high boiling organic solvents having boiling points>200° C.;
    about 0.1% to about 5% by weight of an alkoxysilane coupling agent;
    about 5% to about 30% by weight of a pigment wetting surfactant;
    about 0.5% to about 20% by weight of pigments;
    about 0.5% to about 20% by weight of fillers; and,
    the balance of water.

7. The composition according to claim 6, wherein said one or more high boiling organic solvents are selected from the group consisting of glycol ethers, alkane diols, 2-pyrrolidone, N-methylpyrrolidone, and combinations thereof.

8. The composition according to claim 6, wherein said alkoxysilane coupling agent is selected from the group consisting of mono-methoxysilanes, di-methoxysilanes, tri-methoxysilanes, mono-ethoxysilanes, di-ethoxysilanes, tri-ethoxysilanes, and combinations thereof.

9. The composition according to claim 6, wherein said pigment wetting surfactant is selected from copolymers and block copolymers of polyethylene glycol ethers, polyethylpropylene glycol ethers, polydimethylsiloxanes, and combinations thereof.

10. The composition according to claim 6, wherein said pigments are selected from metal oxides, and carbon black.

11. The composition according to claim 6, wherein said fillers are selected from metal carbonates, silica, and alumina.

12. A method for making waterborne corrosion resistant primer composition coating, comprising:
    mixing a Part A and a Part B; and
    applying the mixture as a coating;
    wherein Part A comprising:
        at least one surfactant-modified epoxy;
        one or more DiMVO molecules;
        one or more high boiling polar organic solvents;
        an alkoxysilane coupling agent;
        a pigment wetting surfactant;
        pigments and fillers; and
        water;
    and
    Part B comprising:
        at least one surfactant modified, water-dispersed polyamine or polyamide curing agent;
        one or more high boiling polar organic solvents; and
        water
    wherein said one or more DiMVO molecules have the formula:

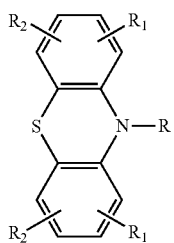
wherein R is a polar, hydrophilic group selected from the group consisting of:
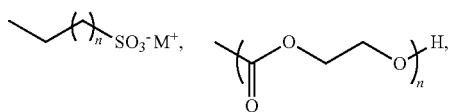
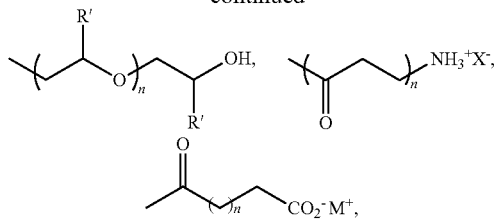
or combinations thereof;
when n is 2-20;
where M is Na, Li, K, $NH_4$, or $NHR''_3$, where R" is alkyl groups of $C_1$-$C_{10}$;
where R' is H or $CH_3$; and,
where X is Cl, Br, or I; and,
wherein $R_1$ and $R_2$ are H or alkyl or alkylene groups of $C_1$ to $C_{20}$.
* * * * *